United States Patent
Yokota et al.

(10) Patent No.: US 8,905,598 B2
(45) Date of Patent: Dec. 9, 2014

(54) LIGHTING DEVICE

(71) Applicant: Kabushiki Kaisha Toshiba, Minato-ku (JP)

(72) Inventors: Masahiro Yokota, Fukaya (JP); Osamu Ono, Fukaya (JP); Ken Takahashi, Kumagaya (JP); Shusuke Morita, Fukaya (JP); Nobuo Kawamura, Kumagaya (JP); Takeshi Ookawa, Kumagaya (JP); Hideo Oota, Tokyo (JP); Hidemi Matsuda, Toda (JP); Takashi Nishimura, Fukaya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/024,073

(22) Filed: Sep. 11, 2013

(65) Prior Publication Data

US 2014/0043828 A1    Feb. 13, 2014

Related U.S. Application Data

(63) Continuation of application No. PCT/JP2012/055856, filed on Mar. 7, 2012.

(30) Foreign Application Priority Data

Mar. 11, 2011  (JP) .................................. 2011-054342
Jul. 29, 2011   (JP) .................................. 2011-167570

(51) Int. Cl.
*F21K 99/00* (2010.01)
*F21V 3/02* (2006.01)
*F21V 8/00* (2006.01)
*F21V 29/00* (2006.01)
*F21Y 101/02* (2006.01)

(52) U.S. Cl.
CPC . *F21K 9/52* (2013.01); *F21K 9/135* (2013.01); *F21V 3/02* (2013.01); *G02B 6/0033* (2013.01); *F21V 29/2231* (2013.01); *F21Y 2101/02* (2013.01)

USPC ................. 362/311.06; 362/235; 362/249.02; 362/311.01; 362/310

(58) Field of Classification Search
USPC ............... 362/235, 311.06, 249.02, 656, 640, 362/310, 311.01, 311.02
See application file for complete search history.

(56) References Cited

U.S. PATENT DOCUMENTS 7,407,303 B2    8/2008  Wanninger et al.
(Continued)

FOREIGN PATENT DOCUMENTS

JP    10-021710    1/1998
(Continued)

OTHER PUBLICATIONS

International Preliminary Report on Patentability issued Sep. 26, 2013 in PCT/JP2012/055856 filed on Mar. 7, 2012 (English translation only).
(Continued)

*Primary Examiner* — Anabel Ton
(74) *Attorney, Agent, or Firm* — Oblon, Spivak, McClelland, Maier & Neustadt, L.L.P.

(57) ABSTRACT

According to one embodiment, a lighting device includes a base member, a light source on the base member, a light-transmitting cover configured to cover the light source and to emit light emitted from the light source to the outside, and a light guide body provided opposite the light source and configured to guide, to the rear of the light source, at least part of the light from the light source. The cover includes a back light-transmitting region having a plane-normal line directed rearwardly. The light guide body includes a light-incident portion facing the light source and a light guide-emitting portion curvedly extending outward from the light-incident portion, having a distal end portion extending along the back light-transmitting region and directed to the rear.

15 Claims, 13 Drawing Sheets

(56) References Cited

U.S. PATENT DOCUMENTS

| | | | |
|---|---|---|---|
| 8,267,549 B2 | 9/2012 | Hwang et al. | |
| 8,382,325 B2 | 2/2013 | Hisayasu | |
| 8,496,349 B2 * | 7/2013 | Wu et al. | 362/249.02 |
| 2013/0335966 A1 * | 12/2013 | Yokota et al. | 362/235 |

FOREIGN PATENT DOCUMENTS

| | | |
|---|---|---|
| JP | 2004-342411 A | 12/2004 |
| JP | 2005-005546 A | 1/2005 |
| JP | 2006-190684 A | 7/2006 |
| JP | 2007-194132 A | 8/2007 |
| JP | 4076329 | 4/2008 |
| JP | 4135485 A | 8/2008 |
| JP | 4290887 | 7/2009 |
| JP | 2009-269697 A | 12/2009 |
| JP | 2010-015754 A | 1/2010 |
| JP | 2010-027282 A | 2/2010 |
| JP | 2010-40364 A | 2/2010 |
| JP | 3159619 U | 5/2010 |
| JP | 3163068 U | 9/2010 |
| JP | 2010-272496 A | 12/2010 |
| JP | 2011-14305 A | 1/2011 |
| JP | 2011-014515 A | 1/2011 |
| JP | 2011-14535 A | 1/2011 |
| JP | 3169376 U | 7/2011 |
| WO | 2011/010535 A1 | 1/2011 |

OTHER PUBLICATIONS

Written Opinion issued Jun. 12, 2012 PCT/JP2012/055856 filed on Mar. 7, 2012 (English translation only).

International Search Report mailed Jun. 12, 2012 for PCT/JP2012/055856 filed on Mar. 7, 2012 with English Translation.

International Written Opinion mailed Jun. 12, 2012 for PCT/JP2012/055856 filed on Mar. 7, 2012.

* cited by examiner

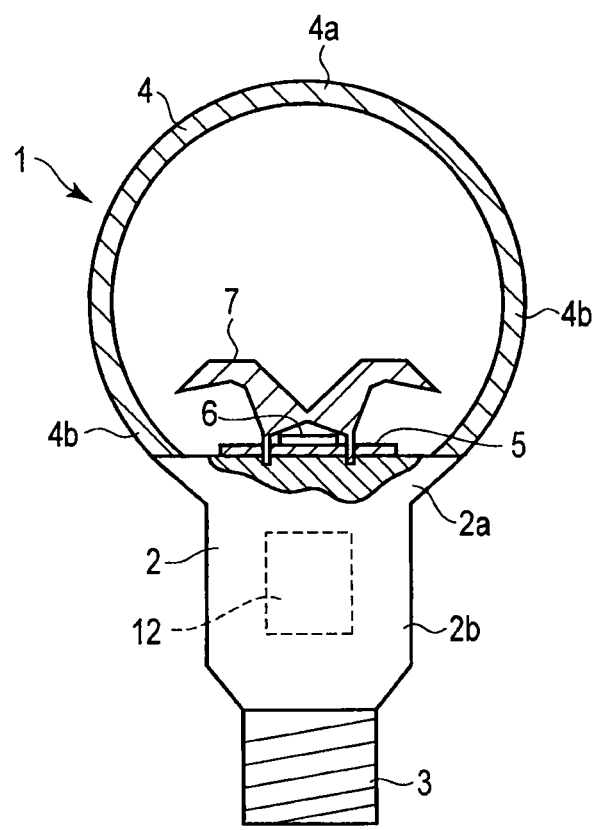
F I G. 3

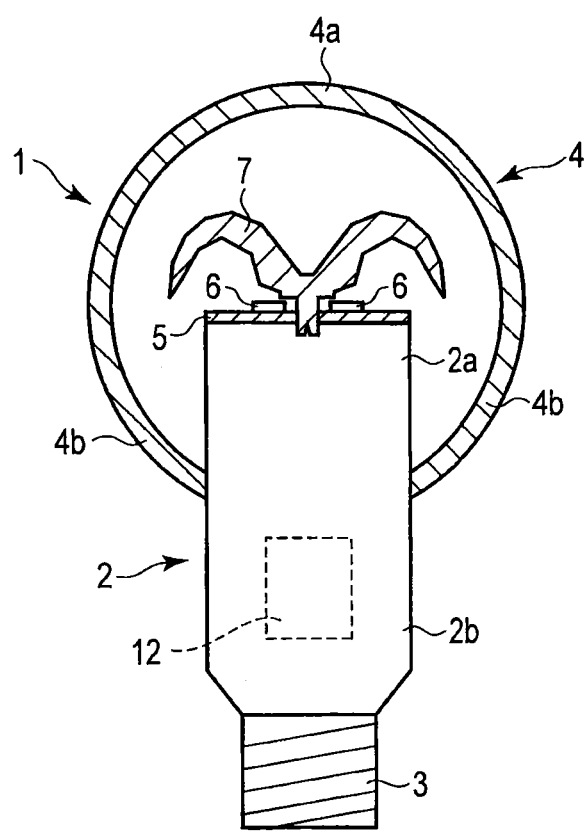
F I G. 4

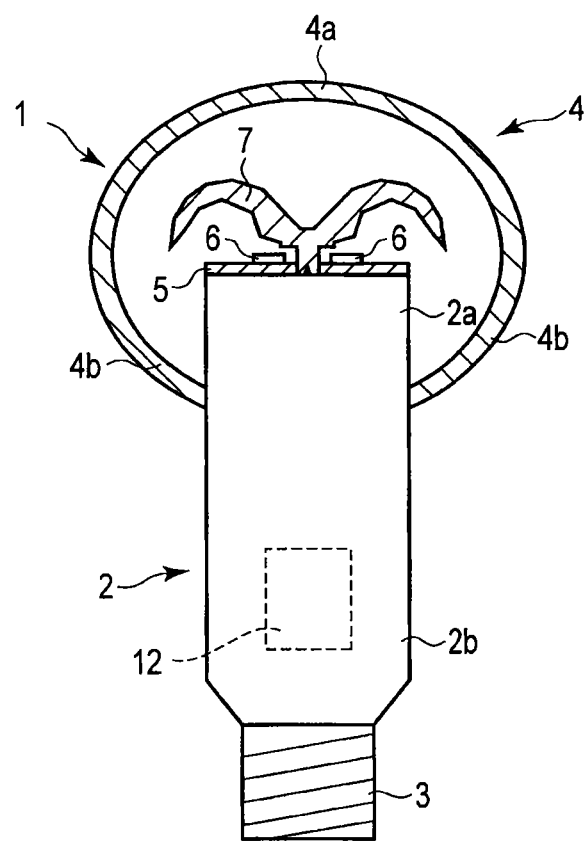
F I G. 5

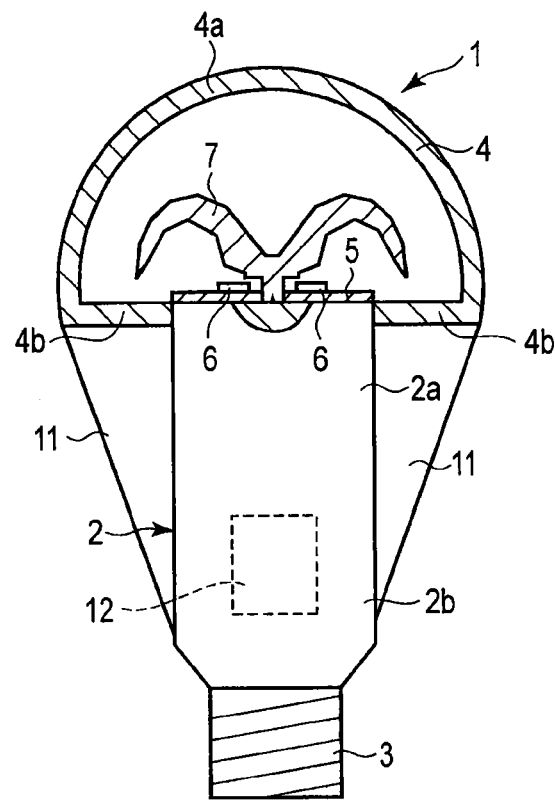
F I G. 7
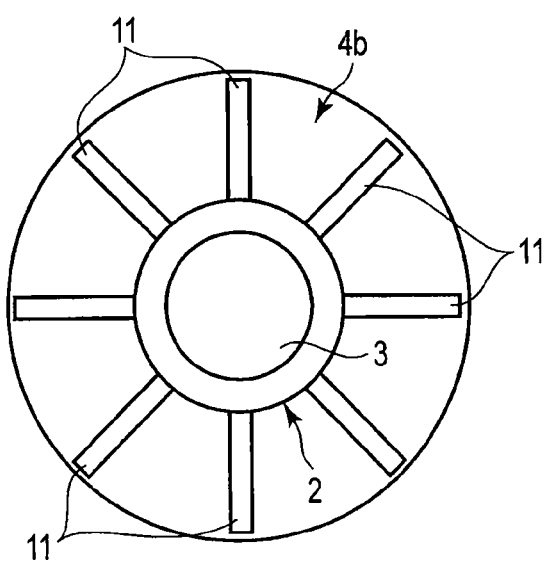
F I G. 8

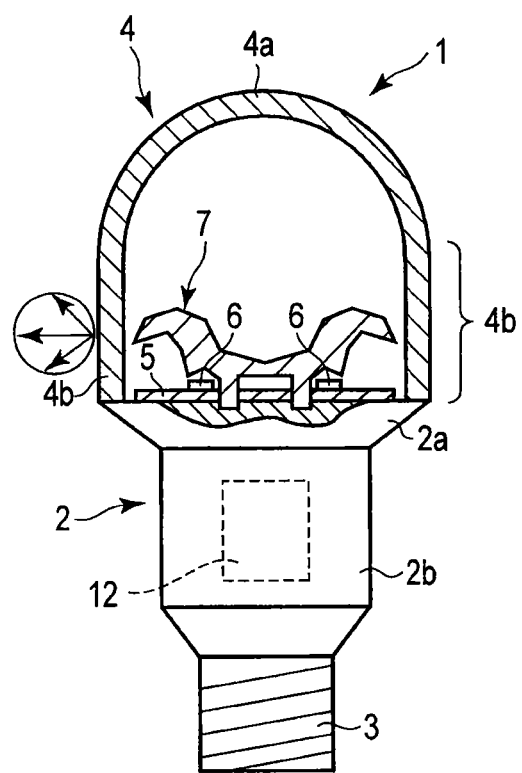
F I G. 10

LIGHTING DEVICE

CROSS-REFERENCE TO RELATED APPLICATIONS

This application is a Continuation Application of PCT Application No. PCT/JP2012/055856, filed Mar. 7, 2012 and based upon and claiming the benefit of priority from Japanese Patent Applications No. 2011-054342, filed Mar. 11, 2011; and No. 2011-167570, filed Jul. 29, 2011, the entire contents of all of which are incorporated herein by reference.

FIELD

Embodiments described herein relate generally to a lighting device using light sources with a narrow luminous-intensity distribution, surface-mounted like white light-emitting diodes (LEDs).

BACKGROUND

Although incandescent bulbs based on light emission by heated filaments have been widely used as lighting devices, they have had problems of short life, luminous efficiency, etc.

In recent years, LED light sources and EL (electroluminescence) light sources have been developed as technologies to solve these problems, and use of the LED light sources, in particular, for conventional lighting devices have been exponentially spread.

In general, the external shape of an LED bulb is defined by a cap attached to a metallic base member and a hemispherical light-transmitting cover, and a mounting substrate mounted with an LED light source in a position corresponding to the spherical center of the light-transmitting cover is attached to the base member. The light source is caused to emit light through a drive circuit in the base member by electricity supplied through the cap.

Light from the light source mounted on the mounting substrate has such directivity that the luminous intensity is attenuated in proportion to cos θ, where θ is an angle between the normal direction of the mounting substrate and strong light emitted normal to the mounting substrate. This is because the conventional LED light source is configured so that an LED chip that emits a primary light beam is covered flat by a protective layer containing a phosphor that converts the primary light beam into a secondary light beam. Thus, a lighting device using an LED light source for a bulb or fluorescent lamp has such a luminous-intensity distribution that light normal to the mounting substrate is strong and hardly any light is emitted laterally or to the rear relative to the mounting substrate. If a conventional incandescent bulb or fluorescent lamp that has a substantially uniform luminous-intensity distribution from front to back is replaced with the lighting device using the LED light source, therefore, the brightness of the ceiling and walls is inevitably greatly changed, resulting in a differently illuminated space.

A technique in which LEDs that constitute a light source are laterally and rearwardly disposed in a three-dimensional manner is proposed as a technique to solve the problem of the narrow luminous-intensity distribution. As another technique, moreover, there is a technique in which the inner surface of a light-transmitting cover is coated with a phosphor that can be excited by light from an LED light source, whereby the light-transmitting cover itself glows. Still another technique is proposed in which a light source is disposed at the lower end of a spherical light-transmitting cover. There is still another technique in which a light guide body is installed near an LED light source.

If an LED light source is mounted three-dimensionally, there are problems that the manufacture and assembly of a lighting device are complicated and the difficulty of the design for mechanical strength and thermal dissipation inevitably increases. Also if a phosphor is applied to a light-transmitting cover, there is a problem that the manufacture and assembly of the lighting device are complicated. If the light source is disposed at the lower end of a spherical light-transmitting cover, a base member is made shorter or smaller than the overall length restriction of the lighting device, so that thermal radiation is inevitably degraded and fails to produce a large amount of heat. If a light guide body is installed, moreover, the prior art techniques can provide neither a sufficient luminous-intensity distribution control function nor a natural design.

BRIEF DESCRIPTION OF THE DRAWINGS

FIG. 3 is a sectional view showing a bulb-type lighting device according to a second embodiment;

FIG. 4 is a sectional view showing a bulb-type lighting device according to a third embodiment;

FIG. 5 is a sectional view showing a bulb-type lighting device according to a fourth embodiment;

FIG. 7 is a sectional view showing a bulb-type lighting device according to a sixth embodiment;

FIG. 8 is a plan view of the lighting device according to the sixth embodiment taken from the cap side;

FIG. 10 is a sectional view showing a bulb-type lighting device according to an eighth embodiment;

DETAILED DESCRIPTION

Various embodiments will be described in detail with reference to drawings. In general, according to one embodiment, a lighting device comprises a base member, a light source disposed on a front portion of the base member, a light-transmitting cover attached to the base member so as to cover the light source and configured to emit light emitted from the light source to the outside, and a light guide body provided opposite the light source and configured to guide, to the rear relative to the light source, at least part of the light emitted in a forward direction from the light source. The luminous intensity of the light emitted from the light source has strong forward directivity in the normal direction of the front of the base member, the light-transmitting cover comprises a back light-transmitting region having a plane-normal line directed rearwardly relative to the lighting device. The light guide body comprises a light-incident portion facing the front of the light source and a light guide-emitting portion curvedly extending outward from the light-incident portion, comprising a distal end portion extending along the back light-transmitting region and directed to the rear relative to the light source, and configured to guide and emit light incident on the light-incident portion through the distal end portion.

First Embodiment

Figure 1:
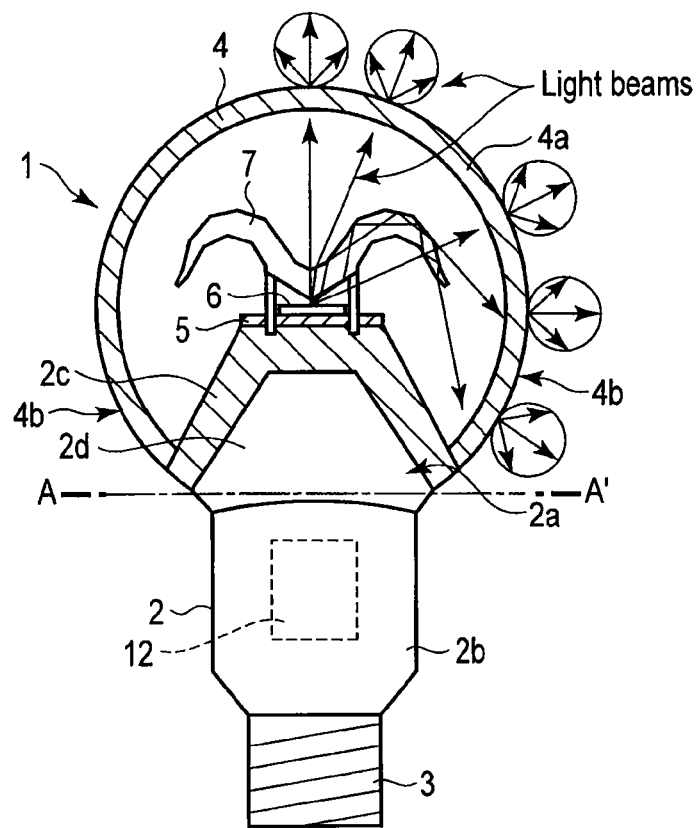
FIG. 1 is a sectional view showing an LED bulb according to a first embodiment.

FIG. 1 shows an LED bulb 1 for use as a bulb-type lighting device according to a first embodiment. The drawing is a sectional view, and the LED bulb 1 has a shape rotationally symmetrical with respect to a central axis.

The LED bulb 1 comprises a base member 2, light source 6 formed of LEDs, substantially spherical light-transmitting cover 4, cap 3, and light guide body 7 disposed on the light source 6.

The base member 2 serves both as a metallic housing and as a heat radiating member, a top portion 2a of which is substantially in the form of a frustum of a cone and comprises a flat portion at its upper end and a bottom portion 2b of which is substantially columnar and is fitted with the cap 3 at its lower end. A drive circuit 12 configured to drive the light source 6 is accommodated in the base member 2. The base member 2 holds the light-transmitting cover 4 and cap 3 and forms the outer surface shape of the LED bulb 1, and also doubles as a heat sink and a thermal radiation plate for heat from the light source 6. The surface of the base member 2 is white-coated so that it is higher in reflectance than the other parts, light reflected and scattered inside the light-transmitting cover 4 is less susceptible to absorption losses, and heat can be efficiently radiated to the air.

The top portion 2a of the base member 2 projects long to the spherical center of the light-transmitting cover 4. The top portion 2a that holds the light source 6 forms radiator fins 2c for use as heat conducting units and ensures a thermal radiation space 2d inside the base member 2. The base member 2 makes up for the surface area of convective thermal radiation to air that is reduced by a back light-transmitting region 4b of the light-transmitting cover 4.

Figure 2:
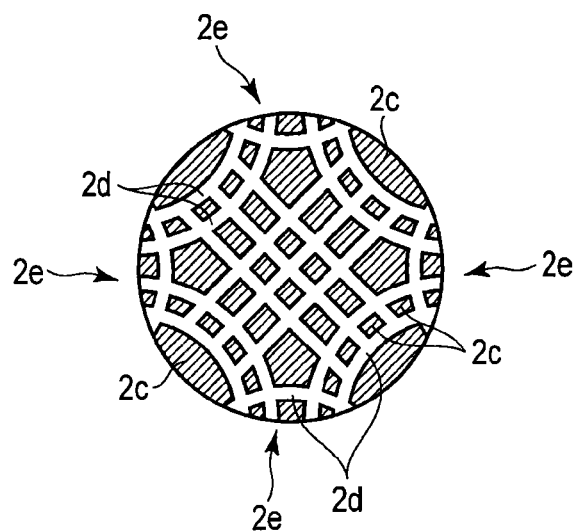
FIG. 2 is a sectional view of the LED bulb taken along line A-A of FIG. 1.

FIG. 2 shows a horizontally cutaway cross-section of the top portion 2a of the base member 2. The top portion 2a comprises a plurality of radiator fins 2c that extend into the thermal radiation space, and air is taken in and out through four gill-like openings 2e on the periphery of the base member 2. With this arrangement, the base member 2 having a heat-sink thermal radiation function as high as that of a conventional one can be formed even though the light-transmitting cover 4 is in the form of a large sphere, as in the present embodiment.

As shown in FIG. 1, the light source 6 comprises a plurality of LED chips and a sealing resin that collectively covers the plurality of LED chips, and phosphor particles that change primary light beams from the LED chips into white light beams are dispersed in the sealing resin. The light source 6 is mounted on a mounting substrate 5. The mounting substrate 5 is supported on a front portion of the base member 2. Electricity supplied through the cap 3 is supplied to the light source 6 through the drive circuit 12, and the light source 6 emits white light. This white light is intensely emitted normal to the mounting substrate 5, that is, in the forward direction relative to the LED bulb 1.

The light-transmitting cover 4 is substantially spherical and is secured to and supported by the top portion 2a of the base member 2 with its center substantially in alignment with the light source 6. Thus, the light-transmitting cover 4 covers the outer periphery of the top portion 2a of the base member 2 as well as the front, lateral, and back sides of the light source 6.

In the present embodiment, the light-transmitting cover 4 is a milk-white member in the shape of a sphere with a transmittance of 60% disposed so that the light source 6 lies on the spherical center. Further, the light-transmitting cover 4 comprises a front light-transmitting region 4a having its plane-normal direction facing forward relative to the LED bulb 1 and the back light-transmitting region 4b facing backward. The light-transmitting cover 4 has a substantially circular cross-sectional shape, and the back light-transmitting region 4b is located at the back of the circle.

The light guide body 7 is disposed in front of the light source 6 inside the light-transmitting cover 4 and supported on the front portion of the base member 2. The light guide body 7 has a seagull-like cross-section and is formed into a shape coaxial with the central axis of the lighting device 1 and rotationally symmetrical with respect to a central axis. The light guide body 7 integrally comprises a light-incident portion facing the light source 6 and configured to receive light from the light source 6 and a light guide-emitting portion curvedly extending outward from the light-incident portion. The distal end portion of the light guide-emitting portion is located along a circle coaxial with the central axis of the lighting device 1 and faces the entire circumference of the back light-transmitting region 4b. Thus, the distal end portion of the light guide-emitting portion is formed so as to extend along the back light-transmitting region 4b. The light guide body 7 receives at least part of strong light emitted in a forward direction from the light source 6, guides the light in a curve and inversely by means of the light guide-emitting portion that is continuous with the outside of the light-incident portion, and emits a main guided light beam into the back light-transmitting region 4b through the distal end portion directed toward the back light-transmitting region 4b.

In the present embodiment, the overall length of the LED bulb 1, the maximum width of the light-transmitting cover 4, and the minimum diameter (bottom opening diameter) of the back light-transmitting region 4b are set to 119 mm, 60 mm, and 44 mm, respectively, the light source 6 is disposed on the spherical center of the 60%-transmittance light-transmitting cover 4, and the light guide body 7 having the seagull-like cross-section is disposed in front of the light source 6. In this way, the half angle of light distribution, the luminous intensity variation within the range of the half angle of light distribution, and the efficiency were able to be set to 340°, ±20% or less, and 90%, respectively.

Further, the light guide body 7 is an injection-molded part with the maximum diameter of 40 mm, which can be directly covered by the light-transmitting cover 4 in such a manner that the light guide body 7 is attached to the front of the base member 2, so that the manufacture is easy. Since the base member 2 is formed with the radiator fins 2c and the like by casting, there are no difficulties in its manufacture. The mounting substrate 5 is used singly, and the LED bulb 1 can be manufactured by an assembly method equivalent to conventional one.

Furthermore, the transmittance of the light-transmitting cover of the present embodiment is set to 60%, which is lower than the normal range of 85 to 90%. This is done in order to mitigate unevenness in luminance over the light-transmitting cover due to light locally concentrated by the light guide body 7. Preferably, the transmittance should be set to 80% or less in order to ensure the mitigation effect and to 40% or more in order to avoid considerable efficiency degradation.

In the present embodiment, the light guide body comprising the light-incident portion is used to cover a single integrated LED light source. Alternatively, however, the light source may be formed of a plurality of distributed LED light sources or a light guide body that guides light to some of the LED light sources.

The following is a description of lighting devices according to alternative embodiments. In the description of the alternative embodiments to follow, like reference numbers are used to designate the same portions as those of the foregoing first embodiment, and a detailed description thereof is omitted.

Second Embodiment

FIG. 3 is a sectional view showing an LED bulb 1 according to a second embodiment. The basic configuration of the LED bulb 1 is the same as that of the first embodiment.

In the second embodiment, a base member 2 is shaped so as not to project inside a light-transmitting cover 4, and the radiator fin structure provided in the first embodiment is deleted. This embodiment is the same as the first embodiment in that a light-transmitting cover 4 comprises a back light-transmitting region 4b and that light emitted in a forward direction from a light source 6 is guided in a curve by a light guide body 7 and applied to the back light-transmitting region 4b.

In the present embodiment, a low thermal radiation function is suitable for the low-output LED bulb 1, and the luminous-intensity distribution can be widened to emit light to the back side by means of the same optical action as that of the first embodiment.

Third Embodiment

FIG. 4 is a sectional view showing an LED bulb 1 according to a third embodiment. The basic configuration of the LED bulb 1 is the same as that of the first embodiment.

In the third embodiment, a plurality of light sources 6 are arranged side by side on a circle concentric with a central axis on a substrate 5, whereby the light guide function of a light guide body 7 is improved. In the present embodiment, a plurality of small LED light sources are arranged on the circle so that the light source width in the radial direction is reduced and the light-emitting area of the light sources 6 compared with a light-incident portion of the light guide body 7 with a rotationally symmetrical shape is reduced. Thus, the light guide body 7 can be made small despite the same characteristics as in the first embodiment. Further, the center of the circle on which the light sources 6 are arranged serves as a fixing portion for the light guide body 7.

A top portion 2a of a base member 2 is substantially columnar and comprises no lateral projections. Thus, the opening diameter of a back light-transmitting region 4b of a light-transmitting cover 4 is reduced to 36 mm to increase the area of the back light-transmitting region 4b, whereupon a half angle of light distribution of 360° or more (with which the luminous intensity is not halved even on the back side), luminous intensity variation of ±20%, and efficiency of 92% are achieved.

The overall length of the LED bulb 1, the transmittance of light-transmitting cover 4, etc., are the same as in the first embodiment. Although not shown, a thermal radiation structure is also formed in the same manner as in the first embodiment.

Fourth Embodiment

FIG. 5 is a sectional view showing an LED bulb 1 according to a fourth embodiment.

In the fourth embodiment, a light-transmitting cover 4 is formed into a flat shape such that its cross-sectional shape is substantially elliptical. Further, a base member 2 is 10 mm longer than that of the first embodiment. Thus, the heat sink capacity and thermal radiation area of the base member 2 are increased, so that the high-output LED bulb 1 can be realized.

Fifth Embodiment

Figure 6:
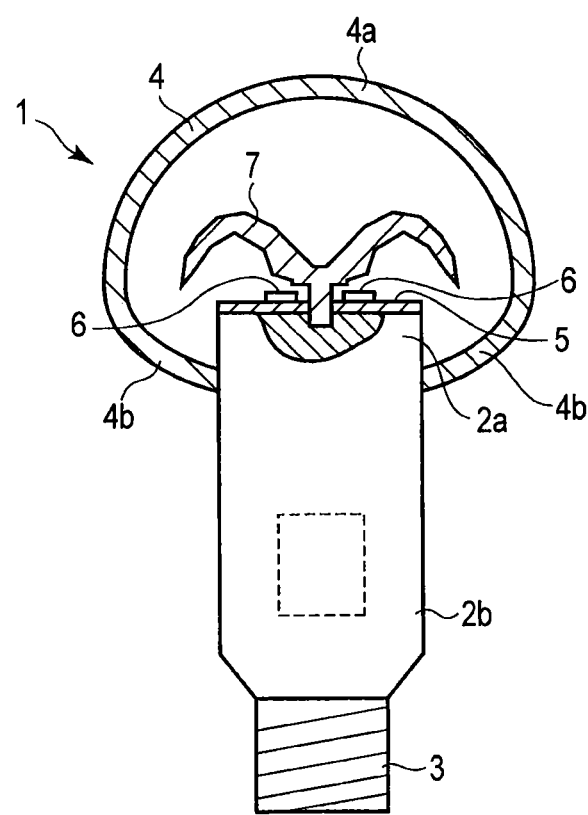
FIG. 6 is a sectional view showing a bulb-type lighting device according to a fifth embodiment.

FIG. 6 is a sectional view showing an LED bulb 1 according to a fifth embodiment.

In the fifth embodiment, a light-transmitting cover 4 is configured so that its front light-transmitting region 4a is in the form of a sphere with a substantially circular cross-section and its back light-transmitting region 4b is in the form of a flat sphere with an elliptical cross-section.

Thus, a base member 2 is lengthened to realize the high-output LED bulb 1, as in the fourth embodiment.

Sixth Embodiment

FIG. 7 is a sectional view showing an LED bulb 1 according to a sixth embodiment, and FIG. 8 is a plan view of the LED bulb 1 taken from the side of a cap 3.

In the sixth embodiment, a light-transmitting cover 4 is formed having a substantially semicircular cross-sectional shape, and a back light-transmitting region 4b of the light-transmitting cover 4 is formed horizontally, that is, parallel to a substrate 5. Thus, a base member 2 is still 20 mm longer than that of the fifth embodiment. Further, a plurality of radially extending radiator fins 11 are provided around the base member 2. Each radiator fin 11 faces the back light-transmitting region 4b and extends to a maximum-diameter portion of the light-transmitting cover 4. The radiator fin 11 is in the form of a plate extending parallel to the longitudinal direction of the LED bulb 1, so as not to interfere with light directed to the rear relative to light sources 6, and has a white-coated surface.

According to the sixth embodiment arranged in this manner, the surface area of the radiator fins 11 is so large that a sufficient thermal radiation effect can be obtained without providing a thermal radiation space inside the base member 2. Thus, the structure of the base member 2 can be simplified. In the sixth embodiment, a half angle of light distribution of 360° or more and efficiency of 92% are achieved.

Seventh Embodiment

Figure 9:
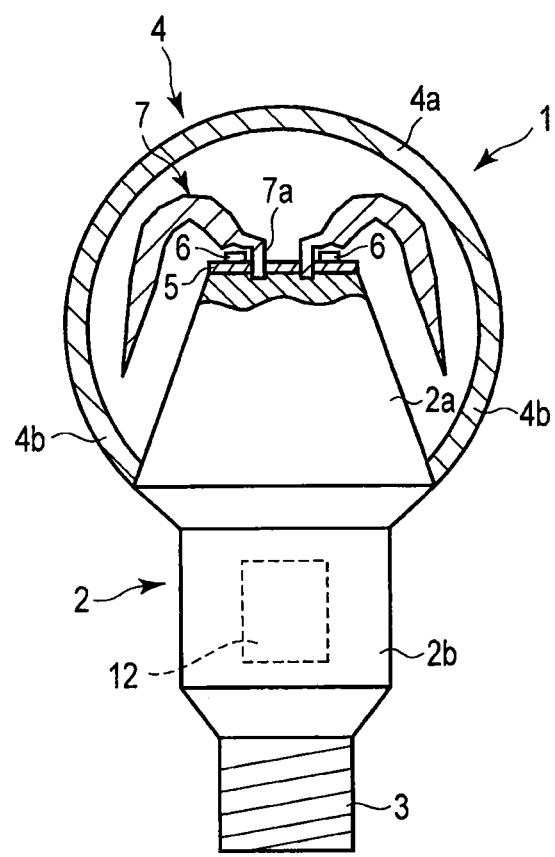
FIG. 9 is a sectional view showing a bulb-type lighting device according to a seventh embodiment.

FIG. 9 is a sectional view showing an LED bulb 1 according to a seventh embodiment.

Although the LED bulb 1 according to the seventh embodiment has the same basic configuration as that of the first embodiment, the location of light sources 6 (upwardly in FIG. 9) projects forward by about 10 mm from the spherical center of a light-transmitting cover 4.

Further, a plurality of light sources 6 are arranged side by side on a circle concentric with a central axis on a substrate 5 so that a large number of small LED light sources are disposed throughout the circumferential length, whereby the radial width of a light-emitting surface of each light source 6 is reduced. A curved light guide portion of a light guide body 7 extends to the vicinity of a back light-transmitting region 4b.

As the light sources 6 are located forward relative to the spherical center of the light-transmitting cover 4, as in the present embodiment, the space inside the light-transmitting cover 4 can be efficiently used as a space for thermal radiation and circuit accommodation, and the higher-output LED bulb 1 can be realized.

In the seventh embodiment, an LED bulb with a half angle of light distribution of 340°, efficiency of 88%, and output higher than that of the first embodiment can be realized.

Eighth Embodiment

FIG. 10 is a sectional view showing an LED bulb 1 according to an eighth embodiment.

Although the LED bulb 1 according to the eighth embodiment has the same basic configuration as that of the first embodiment, a light-transmitting cover 4 comprises a cylindrical back light-transmitting region 4b and a spherical front light-transmitting region 4a covering its front and, unlike those of the first to seventh embodiments, does not spherically bulge. Thus, the light-transmitting cover 4 can be formed of a single part by injection molding, so that its mass-productivity is high.

A plurality of light sources 6 are arranged side by side on a circle concentric with a central axis on a substrate 5. A light guide body 7 comprises a ring-shaped light-incident portion facing the plurality of light sources 6 and a light guide-emitting portion curvedly extending outward relative to the light-incident portion and directed to the cylindrical back light-transmitting region 4b. The light guide body 7 is configured so that light emitted in a forward direction from the light sources 6 enters the light-incident portion and is guided through the light guide-emitting portion, and that main light is emitted from the distal end of the light guide-emitting portion to the back light-transmitting region 4b.

Since the back light-transmitting region 4b of the light-transmitting cover 4 is in the form of a cylinder with a plane-normal line directed laterally, the maximum luminous intensity of outwardly emitted light is directed laterally as illustrated. If a cylindrical area is ensured as in the embodiment, however, a sufficient luminous intensity can be ensured for a region centering around the lateral side and extending to the back side. Since the plane-normal line is directed laterally, moreover, die-cutting can be performed in injection molding, so that the light-transmitting cover can be formed of a single part.

In the embodiment, the opening diameter of the light-transmitting cover 4 and the cylindrical height of the back light-transmitting region 4b are set to φ50 and 25 mm, respectively, the front light-transmitting region 4a is formed into a hemisphere with a radius of 23 mm (the diameter of the top portion of the cylinder is set to φ46 to ensure a die-cut taper), and the transmittance is set to 60%. Thus, the light distribution angle is selectable in the range of 260 to 320° depending on the specifications of the light guide body, and moreover, a lateral-intensity-oriented light distribution is optionally available such that the frontal luminous intensity is reduced so that a half or more of the total luminous flux is concentrated on a lateral opening-angle range of 45°.

Ninth Embodiment

Figure 11:
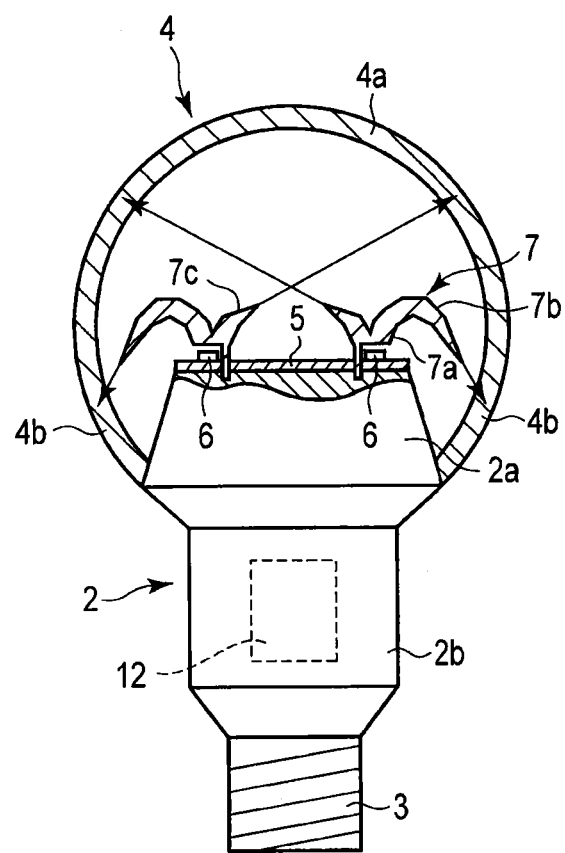
FIG. 11 is a sectional view showing a bulb-type lighting device according to a ninth embodiment.

FIG. 11 is a sectional view showing an LED bulb 1 according to a ninth embodiment.

The LED bulb 1 has the same basic configuration as that of the first embodiment. According to the present embodiment, a light guide body 7 comprises a ring-shaped light-incident portion 7a facing a plurality of light sources 6 disposed in a circle and a light guide-emitting portion 7b curvedly extending outward from the light-incident portion toward a back light-transmitting region 4b of a light-transmitting cover 4 and configured to guide light to the back light-transmitting region. Further, the light guide body 7 integrally comprises a ring-shaped second light guide-emitting portion 7c obliquely extending inward from the light-incident portion. The second light guide-emitting portion 7c emits part of light incident on the light-incident portion 7a obliquely and laterally relative to the light-transmitting cover 4.

By means of the light guide body 7 comprising these forked light guide-emitting portions, luminous-intensity distribution control can be performed at the inside light guide-emitting portion as well as at the outside light guide-emitting portion, so that an LED bulb with further improved luminous-intensity distribution controllability can be obtained.

Tenth Embodiment

Figure 12:
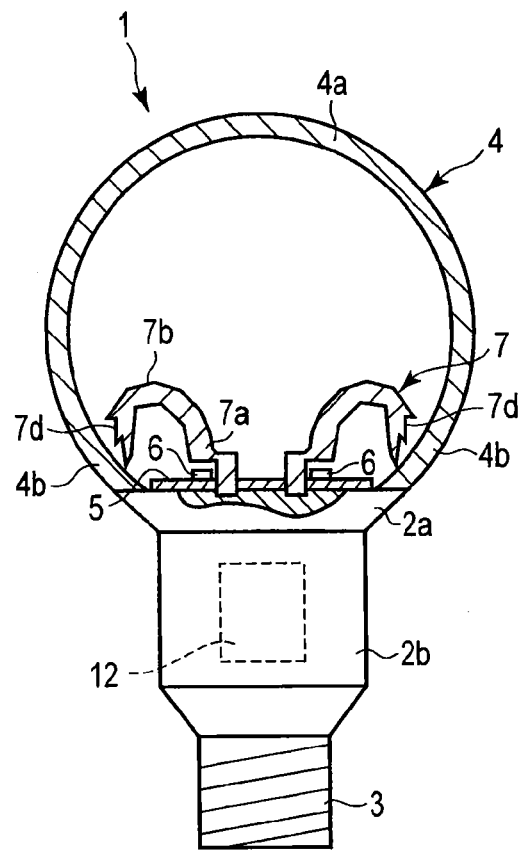
FIG. 12 is a sectional view showing a bulb-type lighting device according to a tenth embodiment.
Figure 13:
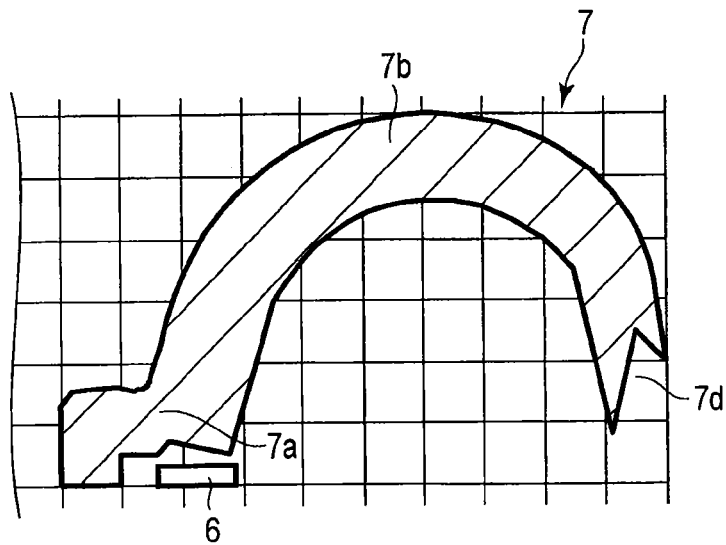
FIG. 13 is a sectional view showing a light guide body of the bulb-type lighting device according to the tenth embodiment.
Figure 14:
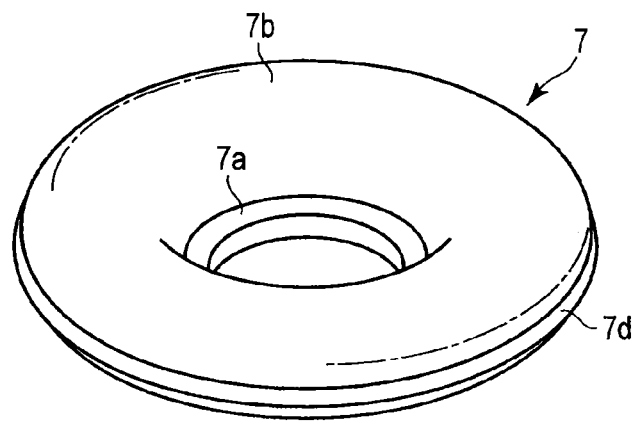
FIG. 14 is a perspective view of the light guide body.
Figure 15:
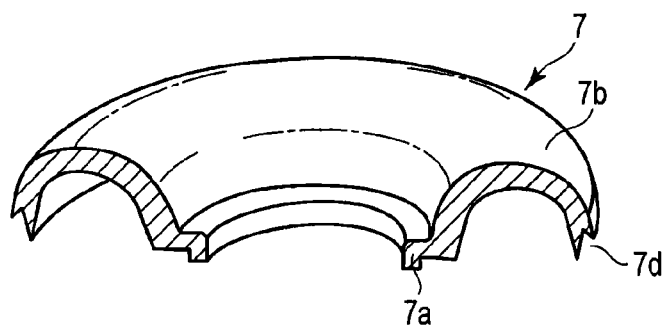
FIG. 15 is a partially cutaway perspective view of the light guide body.
Figure 16:
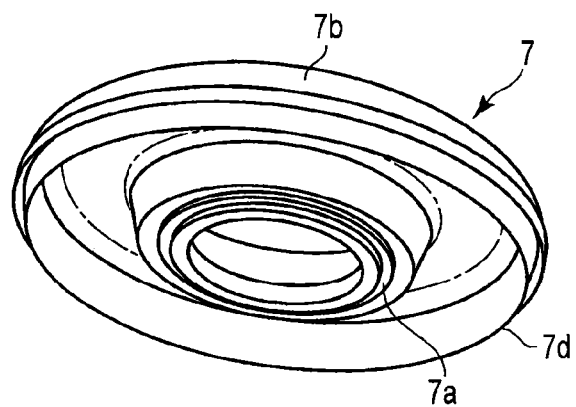
FIG. 16 is a perspective view showing the back side of the light guide body.
Figure 17A:
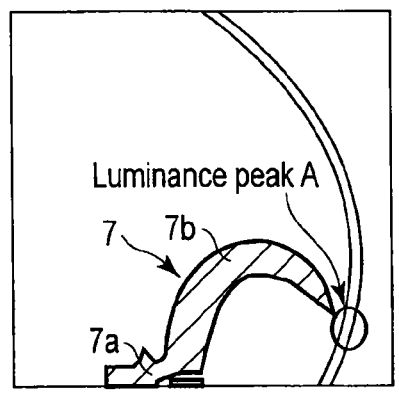
FIG. 17A is a sectional view schematically showing a luminescence peak of a light-transmitting cover in a case where the distal end portion 7 of a light guide-emitting portion is in the form of a single wedge.
Figure 17B:
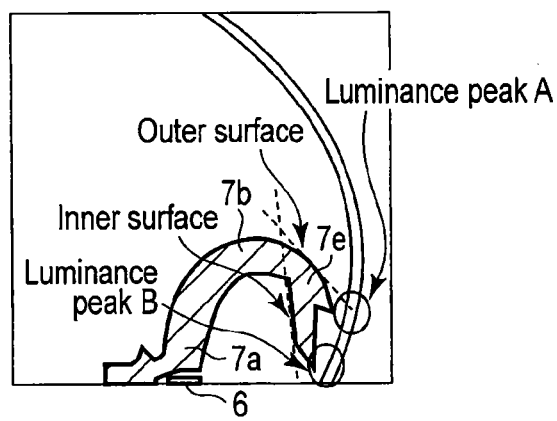
FIG. 17B is a sectional view schematically showing luminescence peaks of the light-transmitting cover in a case where the distal end portion of a light guide-emitting portion are vertically divided in two or three.
Figure 17C:
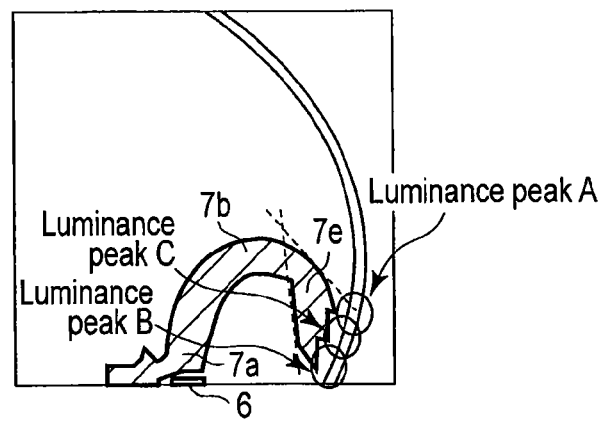
FIG. 17C is a sectional view schematically showing luminescence peaks of the light-transmitting cover in a case where the distal end portion of a light guide-emitting portion are vertically divided in two or three.
Figure 18:
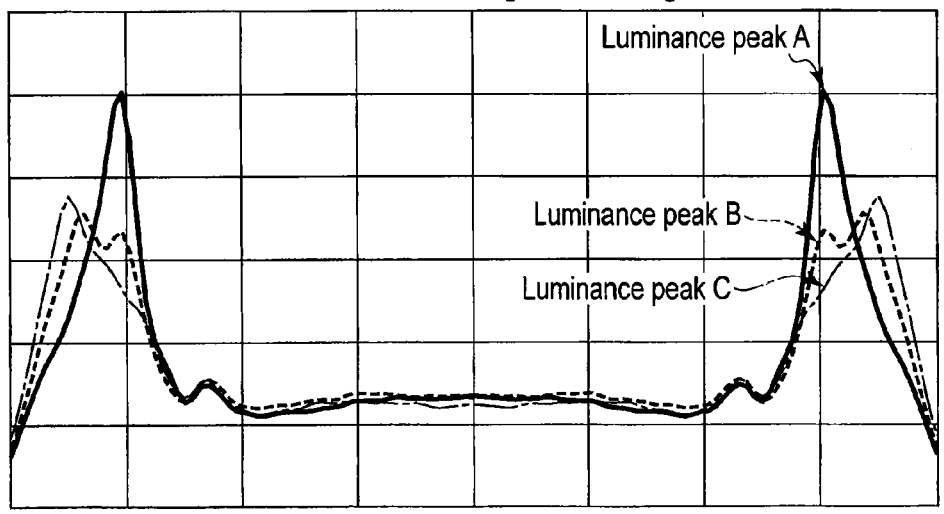
FIG. 18 is a diagram showing luminous-intensity distributions of the light-transmitting covers.

FIG. 12 is a sectional view showing an LED bulb 1 according to a tenth embodiment, and FIG. 13 is a sectional view showing an example in which the distal end portion of a light guide body has two wedge-shaped cross-sections. FIGS. 14 to 16 are perspective views individually showing light guide bodies. FIGS. 17(a), 17(b) and 17(c) are sectional views comparatively showing a case where the distal end portion of a light guide body 17 is formed of a single wedge and a case where the distal end portion comprises two or three wedge-shaped cross-section portions. Further, FIG. 18 comparatively shows luminance distributions of light-transmitting covers that use light guide bodies with different wedge-shaped cross-section portions.

The LED bulb 1 has the same basic configuration as that of the first embodiment. According to the present embodiment, as shown in FIGS. 12 to 16, the light guide body 7 comprises a ring-shaped light-incident portion 7a facing a plurality of light sources 6 disposed in a circle and a light guide-emitting portion 7b curvedly extending outward from the light-incident portion toward a back light-transmitting region 4b of a light-transmitting cover 4 and configured to guide light to the back light-transmitting region. According to the present embodiment, a distal end portion 7d of the light guide-emitting portion 7b is not in the form of a single wedge, and comprises a plurality of wedge-shaped cross-section portions vertically branching in two or three directions or, in this case, located up and down along the central axis of the bulb 1 or in an axial direction parallel to the normal direction of the front of a base member 2. In the case where the distal end portion 7d of the light guide-emitting portion 7b is in the form of a wedge vertically branching in two or three directions, as shown in FIG. 17B or 17C, compared with the case where the distal end portion of the light guide-emitting portion is in the form of a single wedge, as shown in FIG. 17A, the light guide-emitting portion comprises a region 7e thickened into such a shape that the outer surface outwardly opens in contrast with the inner surface, as regards the area outside the region directed laterally outwardly relative to the curved light guide-emitting portion 7b.

The distal end portion 7d comprises the light guide-emitting portion 7b with the plurality of vertically divided wedge-shaped portions, and moreover, the inner and outer surfaces of the light guide-emitting portion 7b are shaped so as to open laterally outward. Thus, light can be reflectively guided to the rear relative to the light sources without interfering with light guided through the light guide-emitting portion 7b. At the same time, the reflectively guided light can be vertically dispersed by the wedge-shaped portions as it is applied to the light-transmitting cover. As seen from FIG. 18, the luminance distribution of the light-transmitting cover is more uniform in the case where the distal end portion comprises two or three wedge-shaped portions than in the case where the distal end portion of the light guide body 7 comprises a single wedge-shaped portion. Thus, a partial high-luminance region created in the light-transmitting cover 4 can be reduced, so that an LED bulb with a more uniform luminance distribution can be realized.

According to the first to tenth embodiments, as described above, there can be provided a bulb-type lighting device capable of lateral or rearward irradiation, that is easy to manufacture, and has a high thermal radiation function.

The lighting device described above guides in a curve light emitted in a forward direction by a basically transparent light guide body with a high refractive index to a bulb using an LED bulb configured to emit strong light in a forward direction and emits the light laterally or to the rear. In guiding light, a reflector guides the light in a curve by Fresnel reflection on a refractive-index interface without using a reflecting member. Thus, the efficiency loss is so small that the irradiation direction can be dramatically deflected.

The present invention is not limited directly to the embodiments described above, and at the stage of carrying out the invention, its constituent elements may be embodied in modified forms without departing from the spirit of the invention. Further, various inventions can be formed by appropriately combining the constituent elements disclosed in the above-described embodiments. For example, some constituent elements may be deleted from all the constituent elements shown in the embodiments. Furthermore, constituent elements of different embodiments may be combined as required.

Although, for example, a structure for taking out light from the light guide body has not been particularly mentioned, the take-out structure may be provided based on joining of grains and diffusion members, or light to be taken out may be scattered by a certain amount of diffusion filler mixed in the very material that constitutes the light guide body. The number and type of the light sources are not particularly specified, and the action of the present invention is applicable to any light sources that have strong forward directivity. Although the light guide body is secured to the base member according to the embodiments, moreover, it may alternatively be secured to the light-transmitting cover.

Although the LED bulb has been described according to the embodiments, furthermore, the invention may also be applied to street lighting based on a combination of a directional light source and a light-transmitting cover that surrounds the light source substantially in a sphere, or alternatively, an electroluminescent light source may be used.

Figure 19:
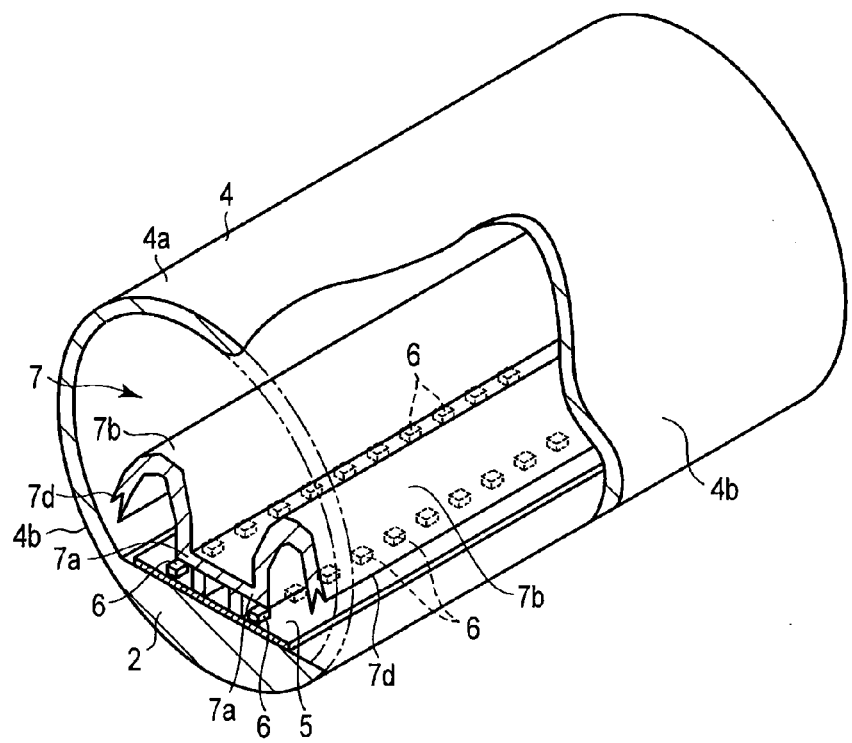
FIG. 19 is a perspective view showing an embodiment applied to a fluorescent-lamp-type lighting device.

Further, the present invention is not limited to the bulb-type lighting device and may also be used for street lighting of a similar form. As shown in FIG. 19, moreover, the lighting device may also be applied to a linear lighting device, such as a fluorescent-lamp-type LED lighting device. The device may be applied to an elongated lighting device configured so that the cross-section described in connection with the foregoing embodiments is stretched. For example, the illustrated fluorescent-lamp-type LED lighting device comprises an elongated base member 2, a plurality of LED light sources 6 linearly arranged in two rows on the base member, elongated, substantially cylindrical light-transmitting cover 4 provided covering these light sources, and light guide body 7 provided opposite the light sources. The light guide body 7 integrally comprises a light-incident portion facing the light sources 6 and two light guide-emitting portions curvedly extending outward on either side from the light-incident portion. Each light guide-emitting portion comprises a distal end portion extending straight along a back light-transmitting region of the light-transmitting cover 4, the distal end portion being configured to emit light guided through the light guide-emitting portions toward the back light-transmitting region.

What is claimed is:

1. A lighting device comprising: a base member, a light source disposed on a front portion of the base member, a light-transmitting cover attached to the base member so as to cover the light source and configured to emit light emitted from the light source to the outside, and a light guide body provided opposite the light source and configured to guide, to the rear relative to the light source, at least part of the light emitted in a forward direction from the light source,
wherein the luminous intensity of the light emitted from the light source has strong forward directivity in the normal direction of the front of the base member,
the light-transmitting cover comprises a back light-transmitting region having a plane-normal line directed rearwardly relative to the lighting device,
the light guide body comprises a light-incident portion facing the front of the light source and a light guide-emitting portion curvedly extending outward from the light-incident portion, comprising a distal end portion extending along the back light-transmitting region and directed to the rear relative to the light source, and configured to guide and emit light incident on the light-incident portion through the distal end portion.

2. The lighting device of claim 1, wherein the distal end portion of the light guide-emitting portion comprises a plurality of wedge-shaped cross-section portions in upper and lower different positions in the normal direction of the front of the base member.

3. The lighting device of claim 2, wherein the light guide-emitting portion comprises a region thickened so that the cross-section thereof opens outside a region where guided light is directed outward.

4. The lighting device of claim 1, wherein the light guide body integrally comprises a ring-shaped second light guide-emitting portion obliquely extending inward from the light-incident portion.

5. The lighting device of claim 1, wherein the front portion of the base member and the light source are provided projecting ahead of a back end portion of the back light-transmitting region of the light-transmitting cover.

6. The lighting device of claim 5, wherein the front portion of the base member and the light source are provided projecting ahead of a back end portion of a front light-transmitting region.

7. The lighting device of claim 1, wherein the light source is disposed in a circle.

8. The lighting device of claim 1, wherein the light-transmitting cover has a transmittance of 40% or more and 80% or less.

9. The lighting device of claim 1, wherein the light-transmitting cover is shaped flatter than a sphere.

10. The lighting device of claim 1, wherein the back light-transmitting region of the light-transmitting cover is shaped flatter than a shape obtained by folding back a front portion of the light-transmitting cover in a mirror-symmetric manner.

11. The lighting device of claim 1, wherein the base member comprises radiator fins extending radially outward.

12. The lighting device of claim 11, wherein the radiator fins extend to the back side of the back light-transmitting region.

13. The lighting device of claim 1, wherein the base member comprises therein a space through which external air is circulated by convection, and radiator fins.

14. The lighting device of claim 1, wherein the lighting device is a bulb-type lighting device comprising an LED light source which simulates an incandescent bulb.

15. The lighting device of claim 1, wherein the lighting device is a fluorescent-lamp-type LED lighting device comprising an LED light source which simulates a fluorescent lamp.

* * * * *